(12) United States Patent
Liu et al.

(10) Patent No.: US 11,513,003 B2
(45) Date of Patent: Nov. 29, 2022

(54) ELECTRONIC DEVICES WITH BEAM-STEERED INFRARED LIGHT SENSING

(71) Applicant: Apple Inc., Cupertino, CA (US)

(72) Inventors: Sheng Liu, San Jose, CA (US); Guocheng Shao, Campbell, CA (US); Kenneth J. Vampola, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/922,914

(22) Filed: Jul. 7, 2020

(65) Prior Publication Data

US 2021/0041291 A1   Feb. 11, 2021

Related U.S. Application Data

(60) Provisional application No. 62/883,977, filed on Aug. 7, 2019.

(51) Int. Cl.
*G01S 17/894* (2020.01)
*G01J 3/02* (2006.01)
(Continued)

(52) U.S. Cl.
CPC ............. *G01J 3/0272* (2013.01); *G01J 3/108* (2013.01); *G01J 3/2823* (2013.01); *G01S 17/894* (2020.01); *G02B 27/0172* (2013.01)

(58) Field of Classification Search
CPC ........ G01J 3/0272; G01J 3/108; G01J 3/2823; G01S 17/894; G06N 20/00
See application file for complete search history.

(56) References Cited

U.S. PATENT DOCUMENTS 9,428,257 B2    8/2016  Nelson
9,900,524 B2 *  2/2018  Lammert ................. G01J 5/08
(Continued)

FOREIGN PATENT DOCUMENTS

CN    109937359 A  *  6/2019  ............ G01J 3/0208
WO    2018077870 A1     5/2018

OTHER PUBLICATIONS

Dongik Kim, "An empirical study on iris recognition in a mobile phone", 2016,IEEE Xplore (Year: 2016).*
(Continued)

*Primary Examiner* — Maurice C Smith
(74) *Attorney, Agent, or Firm* — Treyz Law Group, P.C.; G. Victor Treyz; Kendall P. Woodruff (57) ABSTRACT

An electronic device may include sensors such as a visible-light image sensor for capturing images. The sensors may also include optical sensors that operate at other wavelengths. An infrared light sensor may be used to gather an infrared light spectrum of a target object. The infrared light sensor may have a beam steerer and other adjustable components such as adjustable lenses and adjustable polarizers. During operation, an infrared beam emitted by the infrared light sensor may be steered onto the target object using information from a captured visible-light image and/or other sensor data such as distance sensor data, orientation sensor data, three-dimensional image sensor data, and data from other sensors. Infrared spectra, visible-light camera images, and/or data from other sensors may be used in characterizing target objects so that notifications can be provided to a user and other actions taken.

36 Claims, 8 Drawing Sheets

(51) Int. Cl.
  *G01J 3/10*     (2006.01)
  *G01J 3/28*     (2006.01)
  *G02B 27/01*     (2006.01)

(56) References Cited

U.S. PATENT DOCUMENTS

| | | |
|---|---|---|
| 10,117,617 B2 | 11/2018 | Cantu et al. |
| 10,188,299 B2 | 1/2019 | Islam |
| 10,190,976 B2 | 1/2019 | Waxman et al. |
| 10,247,818 B2 | 4/2019 | Hjelmstad |
| 10,318,806 B2* | 6/2019 | Jung ............... G06K 9/00597 |
| 10,558,047 B2 | 2/2020 | Samec et al. |
| 2004/0124359 A1* | 7/2004 | Hamrelius ............ G01J 5/08 |
| | | 250/341.6 |
| 2008/0036593 A1 | 2/2008 | Rose-Pehrsson et al. |
| 2010/0006757 A1* | 1/2010 | Oda .................... G01J 5/20 |
| | | 250/330 |
| 2019/0290148 A1 | 9/2019 | Kang et al. |

OTHER PUBLICATIONS

Andy Eggert, "Laser Tracking System -using OpenCV 3.1 and Raspberry Pi 3", Oct. 31, 2016 (Year: 2016).*

* cited by examiner

ELECTRONIC DEVICES WITH BEAM-STEERED INFRARED LIGHT SENSING

This application claims the benefit of provisional patent application No. 62/883,977, filed Aug. 7, 2019, which is hereby incorporated by reference herein in its entirety.

BACKGROUND

This relates generally to electronic devices and, more particularly, to electronic devices with sensors.

Electronic devices may include sensors. For example, a cellular telephone may have optical sensors for measuring ambient light levels and for monitoring whether a user's head or other body part is in close proximity to the cellular telephone. A cellular telephone may also have a camera for capturing images.

Challenges can arise when using optical sensors in an electronic device. If care is not taken, the sensor data may be difficult to gather or may be insufficient to provide a user with desired functionality.

SUMMARY

An electronic device such as a portable electronic device may be provided with sensors. The sensors may include image sensors such as a visible-light image sensor for capturing images that are displayed on a display in the electronic device. The sensors may also include three-dimensional image sensors, sensors for gathering distance and orientation information, and other sensors.

The sensors of the electronic device may include optical sensors that operate at visible wavelengths, infrared wavelengths, and/or ultraviolet wavelengths. For example, an infrared light sensor may be used to gather an infrared light spectrum on a target object.

An infrared light sensor may have a beam steerer and other adjustable components such as adjustable lenses and adjustable polarizers. During operation, an infrared beam emitted by the infrared light sensor may be steered onto the target object using information from a captured visible-light image and/or other sensor data such as distance sensor data, orientation sensor data, three-dimensional image sensor data, and data from other sensors. Infrared spectra, visible camera images, and/or data from other sensors may be used alone and in combination for characterizing target objects, so that notifications can be provided to a user and other actions taken.

DETAILED DESCRIPTION

Electronic devices may include optical sensors. The optical sensors may operate over one or more wavelength ranges of interest. For example, the optical sensors may operate at visible light wavelengths, infrared light wavelengths, and/or ultraviolet light wavelengths. Optical sensors include light detectors. Some optical sensors may have light sources. For example, an infrared light sensor may have a source of infrared light and an infrared light detector that detects emitted infrared light from the source after the emitted infrared light has reflected from a target object or otherwise interacted with the object.

Using the optical sensors, an electronic device may identify and characterize objects in the environment surrounding the electronic device. For example, sensor measurements may be used to determine which materials are present in an object of interest and to otherwise characterize the object of interest.

Figure 1:
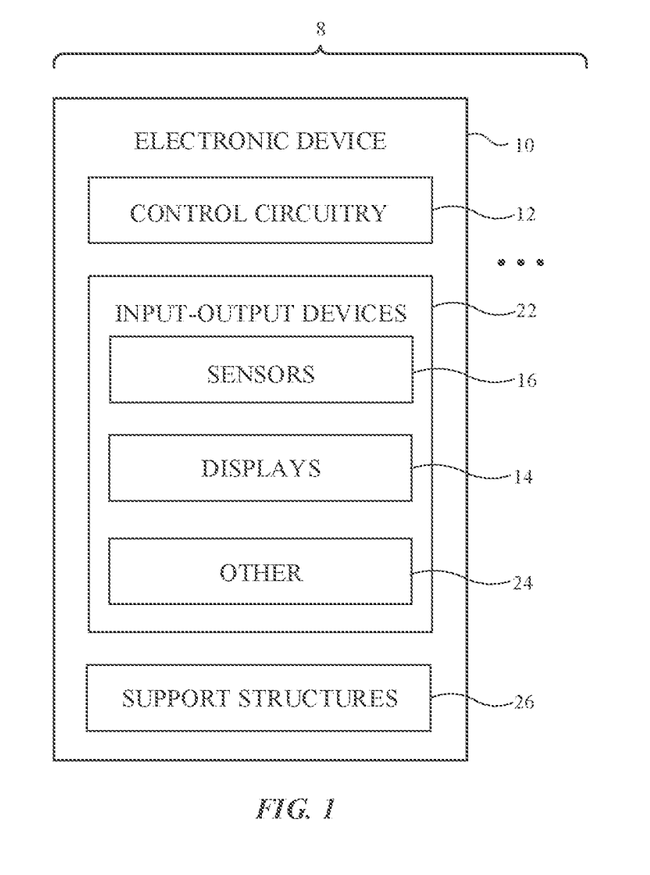
FIG. 1 is a schematic diagram of an illustrative electronic device in accordance with an embodiment.

FIG. 1 is a schematic diagram of an illustrative electronic device with optical sensors. As shown in FIG. 1, system 8 may include one or more electronic devices such as electronic device 10. The electronic devices of system 8 may include computers, cellular telephones, head-mounted devices, wristwatch devices, and other electronic devices.

As shown in FIG. 1, electronic devices such as electronic device 10 may have control circuitry 12. Control circuitry 12 may include storage and processing circuitry for controlling the operation of device 10. Circuitry 12 may include storage such as hard disk drive storage, nonvolatile memory (e.g., electrically-programmable-read-only memory configured to form a solid-state drive), volatile memory (e.g., static or dynamic random-access-memory), etc. Processing circuitry in control circuitry 12 may be based on one or more microprocessors, microcontrollers, digital signal processors, baseband processors, power management units, audio chips, graphics processing units, application specific integrated circuits, and other integrated circuits. Software code may be stored on storage in circuitry 12 and run on processing circuitry in circuitry 12 to implement control operations for device 10 (e.g., data gathering operations, operations involving the adjustment of the components of device 10 using control signals, etc.). Control circuitry 12 may include wired and wireless communications circuitry. For example, control circuitry 12 may include radio-frequency transceiver circuitry such as cellular telephone transceiver circuitry, wireless local area network (WiFi®) transceiver circuitry, millimeter wave transceiver circuitry, and/or other wireless communications circuitry.

In scenarios in which system 8 includes multiple electronic devices, the communications circuitry of the electronic devices (e.g., the communications circuitry of control circuitry 12 of device 10), may be used to support communication between the electronic devices. For example, one electronic device may transmit video, audio, sensor data, and/or other data to another electronic device in system 8. Electronic devices in system 8 may use wired and/or wireless communications circuitry to communicate through one or more communications networks (e.g., the internet, local area networks, etc.). The communications circuitry may be used to allow data to be received by device 10 from external equipment (e.g., a tethered computer, a portable device such as a handheld device or laptop computer, online computing equipment such as a remote server or other remote computing equipment, or other electrical equipment) and/or to provide data to external equipment (e.g., a tethered computer, a portable device such as a handheld device or laptop computer, online computing equipment such as a remote server or other remote computing equipment, or other electrical equipment). Arrangements in which system 8 includes a single device 10 may also be used.

Device 10 may include input-output devices 22. Input-output devices 22 may be used to allow a user to provide device 10 with user input. Input-output devices 22 may also be used to gather information on the environment in which device 10 is operating. Output components in devices 22 may allow device 10 to provide a user with output and may be used to communicate with external electrical equipment.

As shown in FIG. 1, input-output devices 22 may include one or more displays such as display(s) 14. In some configurations, display 14 of device 10 includes left and right display devices (e.g., left and right components such as left and right scanning mirror display devices, liquid-crystal-on-silicon display devices, digital mirror devices, or other reflective display devices, left and right display panels based on light-emitting diode pixel arrays (e.g., organic light-emitting display panels or display devices based on pixel arrays formed from crystalline semiconductor light-emitting diode dies), liquid crystal display devices panels, and/or or other left and right display devices in alignment with the user's left and right eyes, respectively. In other configurations, display 14 includes a single display panel that extends across both eyes or uses other arrangements in which content is provided with a single pixel array. In handheld devices such as cellular telephones, a single pixel array may, for example, be formed on the front face of device 10. Cellular telephones, tablet computers, wristwatches, and other devices may also be provided with multiple displays, if desired.

Display 14 is used to display visual content for a user of device 10. For example, an image that is captured by a camera in device 10 may be displayed on display 14. In some arrangements, the content that is presented on display 14 may include computer-generated content (e.g., virtual objects). Computer-generated content may be displayed in the absence of real-world content or may be combined with real-world content. In some configurations, a real-world image may be captured by a camera (e.g., an outwardly facing camera) so that computer-generated content may be electronically overlaid on portions of the real-world image (e.g., when device 10 is a pair of virtual reality goggles with an opaque display). In other configurations, an optical coupling system may be used to allow computer-generated content to be optically overlaid on top of a real-world image. As an example, device 10 may have a see-through display system that provides a computer-generated image to a user through a beam splitter, prism, holographic coupler, or other optical coupler while allowing the user to view real-world objects through the optical coupler.

Input-output circuitry 22 may include sensors 16. Sensors 16 may include, for example, three-dimensional sensors (e.g., three-dimensional image sensors such as structured light sensors that emit beams of light and that use two-dimensional digital image sensors to gather image data for three-dimensional images from light spots that are produced when a target is illuminated by the beams of light, binocular three-dimensional image sensors that gather three-dimensional images using two or more cameras in a binocular imaging arrangement, three-dimensional lidar (light detection and ranging) sensors, three-dimensional radio-frequency sensors, or other sensors that gather three-dimensional image data), cameras (e.g., infrared and/or visible cameras with respective infrared and/or visible digital image sensors and/or ultraviolet light cameras), gaze tracking sensors (e.g., a gaze tracking system based on an image sensor and, if desired, a light source that emits one or more beams of light that are tracked using the image sensor after reflecting from a user's eyes), touch sensors, buttons, capacitive proximity sensors, light-based (optical) proximity sensors, other proximity sensors, force sensors, sensors such as contact sensors based on switches, gas sensors, pressure sensors, moisture sensors, magnetic sensors, audio sensors (microphones), ambient light sensors, optical sensors for making spectral measurements and other measurements on target objects, microphones for gathering voice commands and other audio input, distance sensors, sensors that are configured to gather information on motion, position, and/or orientation (e.g., accelerometers, gyroscopes, compasses, and/or inertial measurement units that include all of these sensors or a subset of one or two of these sensors), and/or other sensors.

User input and other information may be gathered using sensors and other input devices in input-output devices 22. If desired, input-output devices 22 may include other devices 24 such as haptic output devices (e.g., vibrating components), light-emitting diodes and other light sources (e.g., status indicator lights formed from one or more light-emitting components), speakers such as ear speakers for producing audio output, adjustable optical components (e.g., adjustable polarizers, adjustable lenses, etc.) and other electrical components. Device 10 may include circuits for receiving wireless power, circuits for transmitting power wirelessly to other devices, batteries and other energy storage devices (e.g., capacitors), joysticks, buttons, and/or other components.

Electronic device 10 may have housing structures (e.g., housing walls, straps, etc.), as shown by illustrative support structures 26 of FIG. 1. In configurations in which electronic device 10 is a wrist-mounted device, support structures 26 may include wrist straps. In configurations in which electronic device 10 is a wearable device such as a head-mounted device (e.g., a pair of glasses, goggles, a helmet, a hat, etc.), support structures 26 may include head-mounted support structures (e.g., a helmet housing, head straps, temples in a pair of eyeglasses, goggle housing structures, and/or other head-mounted structures). The head-mounted support structures may be configured to be worn on a head of a user during operation of device 10 and may support display(s) 14, sensors 16, other components 24, other input-output devices 22, and control circuitry 12. In configurations in which device 10 is a handheld device such as a cellular telephone or tablet computer, support structures 26 may be omitted.

Figure 2:
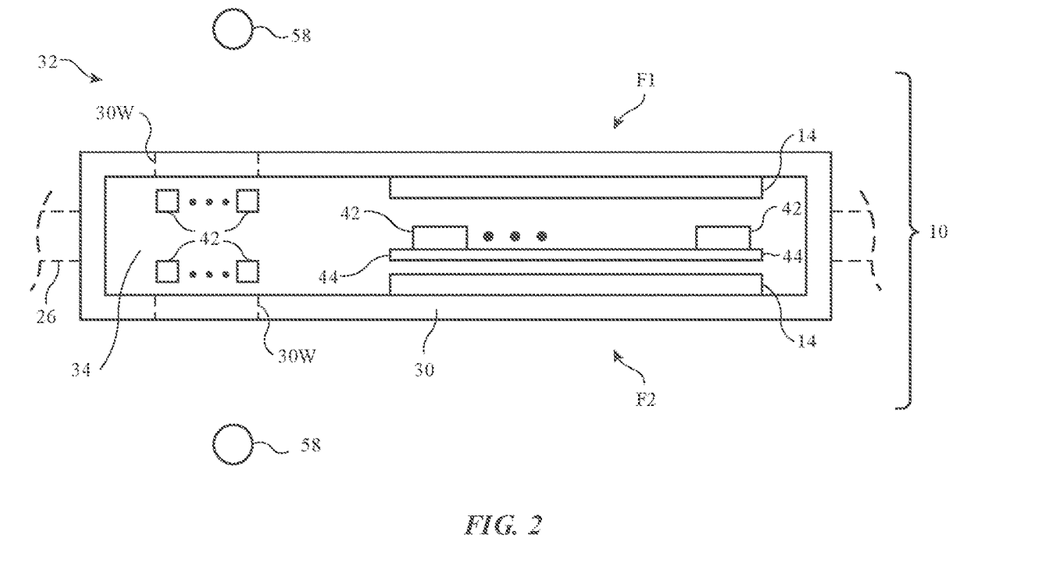
FIG. 2 is cross-sectional view of an illustrative electronic device in accordance with an embodiment.

FIG. 2 is a cross-sectional side view of an illustrative electronic device. As shown in FIG. 2, electronic device 10 may include optional support structures 26 (see, e.g., support structures 26 of FIG. 1). These support structures may be coupled to housing 30. Housing 30 may have housing walls that separate an external region such as exterior 32 (e.g., the external environment surrounding device 10) from an internal device region such as interior 34. Housing 30 may include housing walls and other structures formed from polymer, glass, crystalline material such as sapphire, metal, fiber composite materials such as carbon fiber materials and fiberglass, ceramic, natural materials such as wood, fabric, other materials, and/or combinations of these materials.

One or more displays 14 may be mounted in device 10 (e.g., on side F1 and/or side F2 of device 10). Side F1 may be the front (outwardly facing) side of device 10 and side F2 may be the rear (inwardly facing) side of device 10 (e.g., when device 10 is a head-mounted device) or side F1 may be the rear (outwardly facing) side of device 10 and side F2 may be the front (inwardly facing) side of device 10 (e.g., when device 10 is a cellular telephone). Other configurations for mounting displays and other components in device 10 may be used, if desired. The portions of housing 30 that overlap display(s) 14 may be transparent (e.g., clear glass, sapphire, clear polymer, or other transparent material) and may sometimes be referred to as display cover layers. In some arrangements, transparent portions of housing 30 that overlap display(s) 14 may also overlap optical components, thereby allowing the optical components to transmit and receive light through the transparent housing portions. As shown in FIG. 2, housing 30 may have optical component windows 30 W. Windows 30 W may be formed from portions of transparent housing walls or may be formed from transparent members that are received within openings in housing walls 30. For example, windows 30 W may include transparent window members formed from sapphire or other crystalline material, glass, and/or clear polymer and may be mounted in openings in a metal housing wall or other opaque housing wall. If desired, windows 30 W may be formed from perforations or other openings in housing walls that allow light to pass or other structures that do not block light. Windows 30 W may be formed on side F1, side F2, and/or sidewall portions of housing 30.

Electrical components 42 in interior 34 may be mounted to one or more printed circuits such as printed circuit 44. Components 42 may include integrated circuits, discrete components such as inductors, resistors, and capacitors, sensors 16 and other input-output devices 22 of FIG. 1, circuitry such as control circuitry 12 of FIG. 1, batteries, and/or other devices. In an illustrative arrangement, components 42 include optical components. The optical components in device 10 may overlapped by transparent portions of device 10 such as windows 30 W (as shown by illustrative components 42 adjacent to windows 30 W in FIG. 2).

The optical components of device 10 may include one or more light sources that emit light. The emitted light may illuminate objects in exterior 32 such as objects 58. Emitted light that reflects from objects 58 or that otherwise reaches device 10 after interacting with objects 58 may be detected by one or more light detectors in interior 34.

Figure 3:
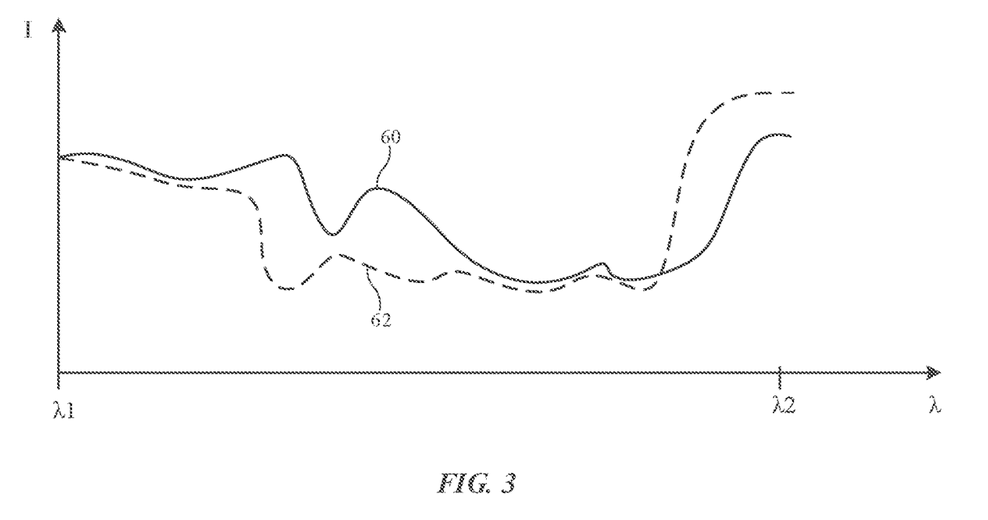
FIG. 3 is a graph of illustrative light spectra that may be obtained during sensor measurements in accordance with an embodiment.

During optical sensor measurements, spectral information on objects 58 (e.g., reflection spectra, transmission spectral, etc.) may be gathered. As an example, consider the graph of FIG. 3. In FIG. 3, the intensity I of light reflected (e.g., scattered, spectrally reflected, etc.) from a target object such as target object 58, transmitted through target object 58, or otherwise received by device 10 after interacting with target object 58 has been plotted as a function of wavelength $\lambda$ over a wavelength range of $\lambda 1$-$\lambda 2$. Curves 60 and 62 show illustrative spectral features (e.g., peaks and valleys associated with molecular vibrational and rotational resonances, etc.) that may be present in two different objects of different materials (curves 60 and 62, respectively) or that may be present in a single object that has changed state from a first state (curve 60) to a second state (curve 62).

The values of $\lambda 1$ and/or $\lambda 2$ that are sensed by optical sensing circuitry in device 10 may lie within visible light wavelengths, ultraviolet light wavelengths, and/or infrared light wavelengths. In some configurations, for example, optical measurements may be made using visible light (e.g., light at wavelengths of 400-700 nm). In other configurations, optical measurements may be made using infrared light (e.g., light at wavelengths of 700 nm-1 mm). Infrared light measurements may be made at near infrared wavelengths of 700-2400 nm, mid-infrared wavelengths of 2400 nm 8000 nm, and/or other infrared wavelengths). Ultraviolet light measurements may also be made, if desired (e.g., at wavelengths of 10 nm to 400 nm). Measurements can be made continuously (or nearly continuously) over one or more wavelength ranges of interest to gather light spectra or may, if desired, be made at only a few discrete representative wavelengths to reduce the use of sensing and processing resources in device 10.

During operation of device 10, real-time optical sensor measurements can be made on light that has interacted with an object of interest such as illustrative target objects 58 of FIG. 2. Interactions between emitted light (e.g., an emitted light beam) and the object of interest may involve measurements of reflected light (e.g., light that is reflected specularly or light that is scattered and thereby reflected non-specularly) and/or measurements of emitted light after the emitted light has been transmitted through an object of interest. Configurations in which measurements are made on specularly and non-specularly reflected light are sometimes described herein as an example. This is merely illustrative. Optical sensors may be used in making measurements on objects of interest by measuring emitted infrared light beams or other light that has interacted with the objects of interest through reflection, scattering, and/or transmission.

Optical sensor data may be used by control circuitry 12 in characterizing objects of interest. Consider, as an example, visible light measurements by device 10. The color of objects reveals information about the objects. Particular objects are known to have particular colors, so a library of color attributes for various different objects can be used by device 10 (e.g., control circuitry 12) in performing object recognition operations.

As another example, consider infrared light measurements. Infrared spectra may contain information on organic and inorganic materials present in an object being sensed. Some infrared spectral information cannot be readily obtained using visible light wavelengths. Accordingly, infrared measurements may reveal information about a sensed external object that is not readily available using visible light sensing alone.

Infrared light may excite vibrational and rotational molecular resonances within a material. Accordingly, infrared optical sensor measurements can be used to provide information on a user's body (e.g., by monitoring a user's breath), food freshness, fat content, etc. In some configurations, device 10 may use optical sensor data associated with multiple different wavelength ranges of interest. As one example, visible light images can be used to help target infrared spectral measurements to particular regions of an object of interest.

Device 10 may include optical systems with optical components such as light source and detectors for making optical sensor measurements. The control circuitry 12 may control the optical components to help control light emission powers and to control pulse widths in pulsed systems. The optical systems may also help control emitted light beam characteristics such as beam size, beam divergence, beam orientation, beam dwell time (and/or scan rate in moving beam arrangements), beam wavelength, beam polarization, etc. The optical systems may include fixed and/or electrically adjustable components such as lenses, polarizers, wave plates, beam steerers (e.g., mirrors or other beam steering devices such as beam steerers using an optical phased array formed from an array of light sources with respective adjustable phases to control beam steering or adjustable diffractive optics such as electrically adjustable gratings), etc. Control circuitry 12 can adjust the electrically adjustable components in adjustable optical sensors in real time during optical sensor measurements. The optical systems may incorporate light sources and light detectors to form optical sensors for device 10 operating at ultraviolet, visible, and/or infrared wavelengths.

Figure 4:
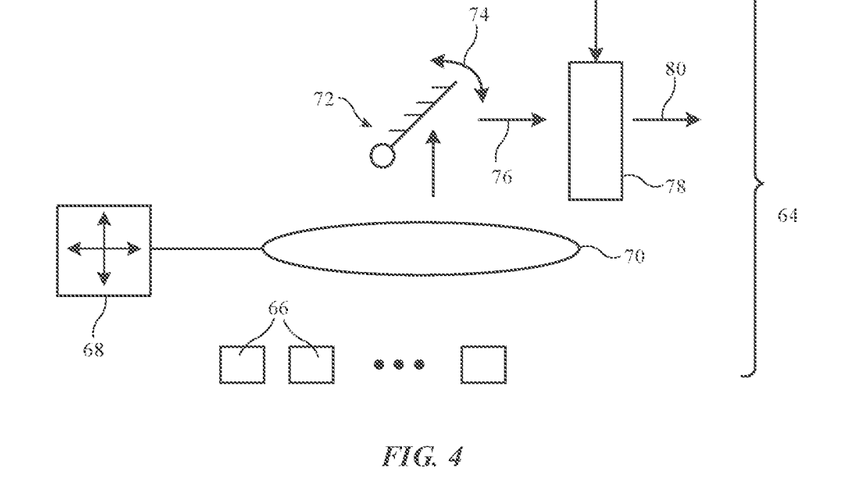
FIG. 4 is a diagram of a portion of an illustrative optical sensor with a light source in accordance with an embodiment.

An illustrative adjustable light source of the type that may be used in an optical sensor is shown in FIG. 4. Adjustable light source 64 may include one or more light-emitting devices 66. Light-emitting devices 66 may be light-emitting diodes (e.g., diodes formed from crystalline semiconductor dies, thin-film organic light-emitting diodes, etc.). Devices 66 may be formed on a common substrate (e.g. a common semiconductor die) or may be discrete components that are mounted on a common printed circuit (as examples). Devices 66 may include devices that operate at one or more different fixed wavelengths and/or may include one or more tunable light-emitting devices. Devices 66 may emit light at wavelengths such as wavelengths $\lambda 1$-$\lambda 2$. Devices 66 may be independently controlled, so that a single wavelength of light may be emitted at a time (if desired). In this way, adjustment of device(s) 66 may be used to adjust the wavelength of a light beam emitted from source 64.

Source 64 may include optical components such as optical component 70. In some configurations, the angular orientation and/or three-dimensional position of component 70 may be adjusted by control circuitry 12 using electrically adjustable positioner 68. Component 70 may be a mechanical lens, an electrically tunable optical component such as a liquid crystal lens, a grating, hologram, optical filter, diffuser, collimator, mirror, light modulator, and/or other optical component. As an example, component 70 and positioner 68 may form an adjustable lens that can adjust beam divergence, focus, beam size, and/or other attributes of a beam of light being emitted by light-emitting device(s) 66. The adjustable lens may include fixed and/or tunable lens elements such as refractive lenses of glass, polymer, or other transparent material, concave and/or convex mirror lenses, holographic mirrors, and/or other focusing devices. The adjustable lenses (and, if desired, other optical components 70) may serve as an adjustable beam expander that controls beam expansion (e.g., beam divergence) during operation as an emitted light beam illuminates a target. If desired, source 64 may include components for beam steering such as adjustable (scanning) mirror 72. Mirror 72 may be rotated in directions 74 (e.g., along two orthogonal axes) to steer the angular orientation of reflected emitted light beam 76 or other component adjustments may be made to steer the emitted beam. Optional additional optical components such as polarizer 78 (e.g., an electrically adjustable polarizer and/or a fixed polarizer) can be used to control the polarization of emitted light beam 76, thereby producing output beam 80 of a desired polarization. Using a system such as adjustable light source 64 of FIG. 4, emitted light attributes such as beam size, beam divergence, beam wavelength, beam timing (fixed and/or pulsed), beam orientation (e.g., angular orientation), beam polarization, and/or other emitted light attributes can be dynamically adjusted. If desired, device 10 may be operated in configurations in which the housing of device 10 and the adjustable light detector in device 10 are placed in contact (immediate direct contact or close proximity) with a target object during light measurements.

An illustrative adjustable light detector of the type that may be used in an optical sensor in device 10 is shown in FIG. 4. Adjustable light detector 94 may be used as a stand-alone optical sensor that senses environmental light (e.g., environmental light that has illuminated and reflected from an object of interest) or may be used to measure light that has been emitted by the adjustable light source 64 after that light has reflected from an object of interest (or has scattered from or transmitted through the object of interest). Adjustable light detector 94 may have one or more photodetectors 92. Photodetectors 92 may be formed from separate semiconductor dies or may be formed on a common semiconductor die such as die 90 of FIG. 5. In configurations in which detector 94 contains multiple photodetectors 92, each of photodetectors 92 may be sensitive to different respective wavelength band (e.g., to facilitate capturing of spectral information). Arrangements in which different photodetectors 92 are overlapped by different polarizers and are therefore sensitive to different polarizations of light may also be used. Adjustable light detector 94 may include adjustable optical components such as adjustable lens 86 and/or other components such as diffusers, filters, mirrors, holograms, etc. Adjustable lens 86 may be an electrically adjustable lens such as a liquid crystal lens and/or a fixed lens that can be moved to a desired position in three dimensions (and, if desired, that can be moved into different angular orientations) using an electrically adjustable positioner such as positioner 88. This allows adjustable lens 86 to help gather and focus incoming light onto photodetectors 92. Optional polarizer 84 may be used to polarize incoming light. Polarizer 84 and polarizer 78 of FIG. 4 may be linear polarizers, circular polarizers, and/or other fixed and/or adjustable polarizers. By controlling the polarization of emitted and detected light, specular light reflections (e.g., reflections of light from metal surfaces or other shiny surfaces) may be discriminated from light reflections (light scattering) from non-specular reflections (e.g., reflections from matte surfaces). Control of the polarization of the emitted and detected light (e.g., using fixed and/or adjustable polarizer structures in the light sensor system may also help discriminate specular and non-specular reflections for light associated with the emitted beam of infrared light after the beam of infrared light has interacted with a target object from ambient light. In an illustrative configuration, polarizer 84 may be a linear polarizer with an adjustable pass axis (or different photodetectors in the light sensor may have respective first and second portions of polarizer 84 with respective orthogonal pass axes). Polarizer 78 may be a linear polarizer so that source 64 emits linearly polarized light that is reflected from an object of interest and detected by detector 94. Specular reflections will be suppressed by polarizer 84 when the pass axes of polarizer 78 and polarizer 84 are orthogonal and will be passed by polarizer 84 when the pass axes of polarizer 78 and polarizer 84 are parallel to each other. Non-specular reflections will be relatively unaffected by polarization. By controlling polarization, the relative contributions of specular reflections and non-specular reflections can therefore be measured. Non-specularly reflected light may correspond to light that has penetrated deeper into objects than specularly reflected light, so by discriminating between specular and non-specular reflections, control circuitry 12 may be provided with the ability to enhance sensor measurement accuracy.

Figure 5:
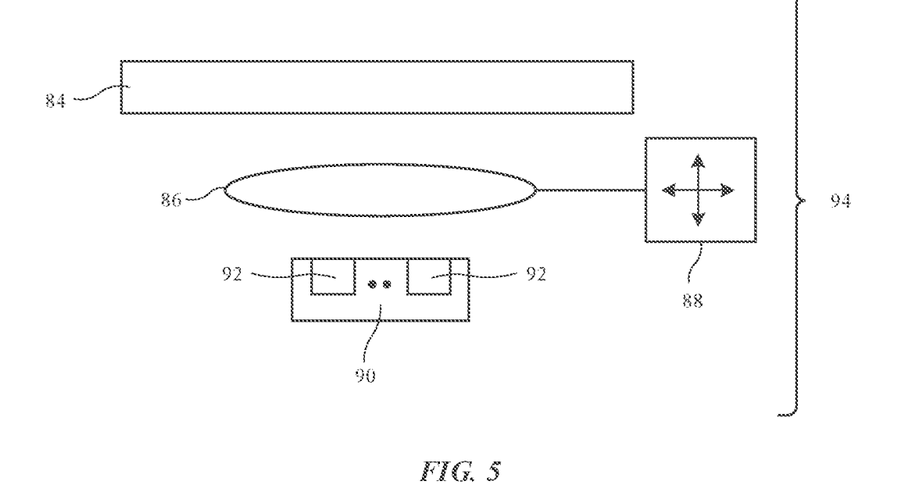
FIG. 5 is a diagram of a portion of an illustrative sensor with a light detector in accordance with an embodiment.

Adjustable light detector 94 may, if desired, contain photodetectors in an image sensing array (e.g., detector 94 may be an image sensor that can capture two-dimensional or three-dimensional images). In general, optical sensors in device 10 may include two-dimensional sensors (e.g., image sensors for capturing two-dimensional images), three-dimensional sensors (e.g., a pair of two-dimensional image sensors arranged in a binocular optical system, a structured light three-dimensional sensor, sensors using time-of-flight information or other information to construct three-dimensional images, or other three-dimensional sensors), and/or detectors that detect light using a single light detector (or set of light detectors with different wavelength sensitivities). Arrangements in which device 10 contains infrared image sensors may be used to capture real-time infrared images that can be combined with visible light images to help characterized target objects.

To ensure that there is sufficient signal-to-noise ratio during sensor measurements, an infrared sensor or other optical sensor in device 10 may use a single emitted light beam and a single corresponding detector. The emitted beam may be modulated in intensity as a function of time using a suitable modulation scheme. A beam steerer such as adjustable mirror 72 of adjustable light source 64 of FIG. 4, may be used to direct the emitted beam to a desired location. Corresponding reflected light may be detected using adjustable light detector 94. In arrangements in which detector 94 has a two-dimensional sensor, visible light images, ultraviolet images, or infrared images can be captured on an object that is illuminated by ambient light. In arrangements in which detector 94 has a single photodetector, spatial information on reflected light can be obtained by using the beam steerer of source 64 to scan the emitted light beam across the object of interest. Steering can also be used to place an emitted light beam at one or more discrete locations on a target object (e.g., so that spatial averaging techniques may be used).

To ensure that sensor data is sampled from a desired object and/or a desired location or locations within an object, information from one or more sensors 16 can be used to assist in beam targeting. Consider, as an example, the illustrative arrangement of FIG. 6. In the illustrative arrangement of FIG. 6, image sensor 98 (e.g., a two-dimensional and/or three-dimensional image sensor operating at infrared and/or visible light wavelengths) is used to capture an image of object 58. Control circuitry 12 may use image processing techniques such as pattern recognition techniques to analyze the captured image to determine the location of object 58 relative to device 10 and to determine suitable target locations within the object. Pattern recognition may be performed on visible light images and/or infrared light images. Once the location of object 58 is determined, a beam steerer in source 64 may be adjusted to direct a beam of light emitted from source 64 such as light beam 100 to object 58. Light beam 100 then reflects from object 58 (specularly and/or non-specularly) and is measured by detector 94. During these measurements, the optical sensor formed from source 64 and detector 94 may be adjusted. For example, beam expansion (divergence) can be adjusted, polarization can be adjusted, wavelength can be adjusted (e.g., by selecting different light-emitting devices within source 64 and/or by tuning an adjustable light-emitting device in source 64), beam orientation can be adjusted, output power may be adjusted (e.g., based on signal strength feedback from the detector of the optical sensor) and/or other adjustments may be made to ensure that satisfactory data is gathered by the optical sensor. If desired, the emitted beam may be scanned in two-dimensions to capture two-dimensional images at the wavelength(s) of light emitted by source 64. In addition to using an image sensor such as image sensor 98 to obtain information that is used in steering beam 100 to a desired target (object 58 in this example), one or more additional sensors 16 can be used to locate targets. These sensors may include, for example, distance sensors based on light, radio-frequency sensing, acoustic sensor components, or other distance sensors, may include three-dimensional image sensors that gather distance information and other locations in formation, and/or other sensors.

Figure 6:
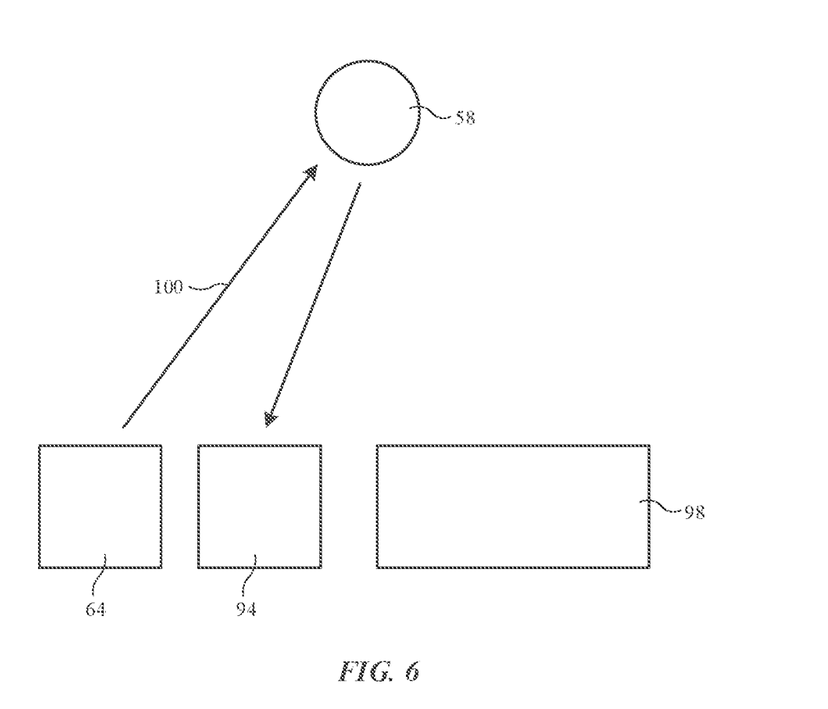
FIG. 6 is a diagram of an illustrative optical sensing system having a light source and corresponding light detector and having an associated supplemental sensor in accordance with an embodiment.
Figure 7:
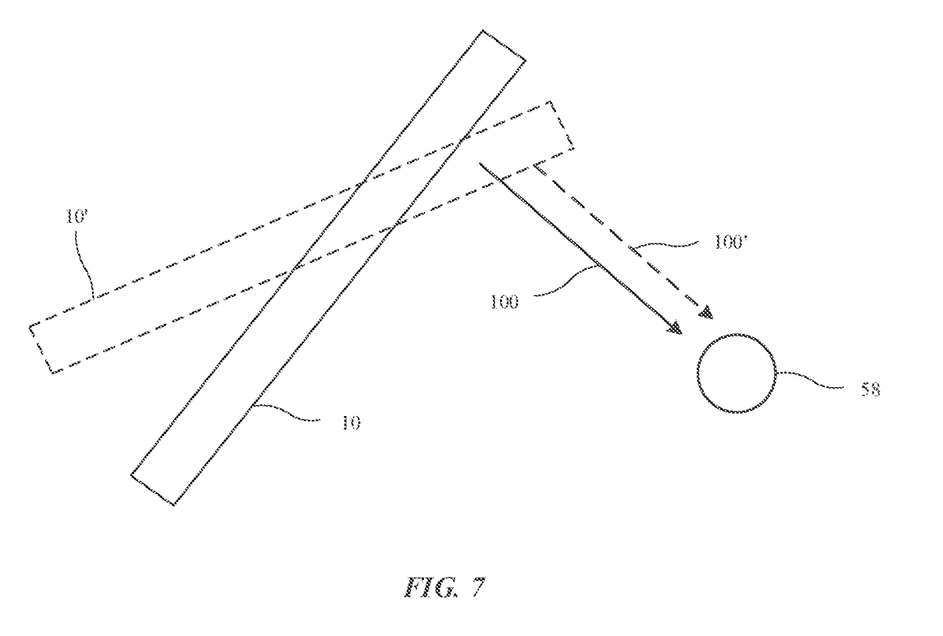
FIG. 7 is a diagram showing how a first sensor may gather information that helps steer a light beam in a second sensor to compensate for movement in accordance with an embodiment.

As shown in FIG. 7, the orientation of beam 100 may be adjusted in real time to compensate for changes in the relative position between object 58 and device 10. If, as an example, device 10 is moved into position 10', beam 100 can be steered by adjustable light source 64 to ensure that beam 100 continues to be aimed at object 58. Control circuitry 12 can monitor the relative positions between device 10 and object 58 using sensors 16 such as image sensor 98 (FIG. 6). If desired, for example, a visual odometry arrangement based on an image sensor may be used to measure orientation information. In some arrangements, device 10 may include an internal measurement unit. The inertial measurement unit (e.g., a position and/or orientation sensor based on an accelerometer, compass, and/or gyroscope), or other position and/or orientation sensor can be used to monitor the position and/or orientation of device 10. Feedback from the position and/or orientation sensor may be used to issue compensating beam steering commands to adjustable light source 64. For example, if a counterclockwise rotation of device 10 by 10° is detected by a sensor, a compensating clockwise rotation of beam 100 by 10° may be produced so that beam 100 remains on target. Camera tracking data (e.g., data from image sensor 98 of FIG. 6) may be used in conjunction with other sensor data in tracking the position of object 58 and the desired orientation of beam 100 to illuminate object 58 during optical sensor measurements.

In addition to assisting with beam tracking operations, image sensor data (camera sensor data) may be used in identifying target objects for sensing. Consider, as an example, camera image 102 of FIG. 8. This type of image may be captured by image sensor 98 (FIG. 6) and processed by control circuitry 12. Control circuitry 12 may, as an example, perform image recognition operations to identify which object is to be measured using optical sensing. Illustrative image 102 contains object 106 (e.g., a tree) and object 104 (e.g., an apple). A user may desire to evaluate food items using optical sensing (e.g., to evaluate ripeness, caloric content, etc.). This preference may be stored in memory in device 10 or may be selected dynamically by a user. When informed of the user's desired preference (to identify foods in this example), control circuitry 12 can analyze image 102 to identify a region (region 108 in the example of FIG. 8) that is believed to contain a food item such as object 104. These image processing operations may involve, for example, pattern matching based on object size, object shape, object color, object shininess, and/or other attributes. After identifying a region that is believed to contain a food item such as object 104, control circuitry 12 may direct light beam 100 to sampling location 110 on object 104 within region 108 (e.g., using a beam steering device such as adjustable mirror 72 of FIG. 4, which can be scanned in multiple dimensions to direct beam 100 where desired). Beam 100 may be used to gather samples at one or more locations (including, if desired, two-dimensional areas on a target object). Beam guidance operations may be performed automatically or with manual guidance from a user. For example, control circuitry 12 can select one or more sampling locations within object 104 based on the size and shape of region 108 or a user may move an on-screen pointer to location 110.

Figure 9:
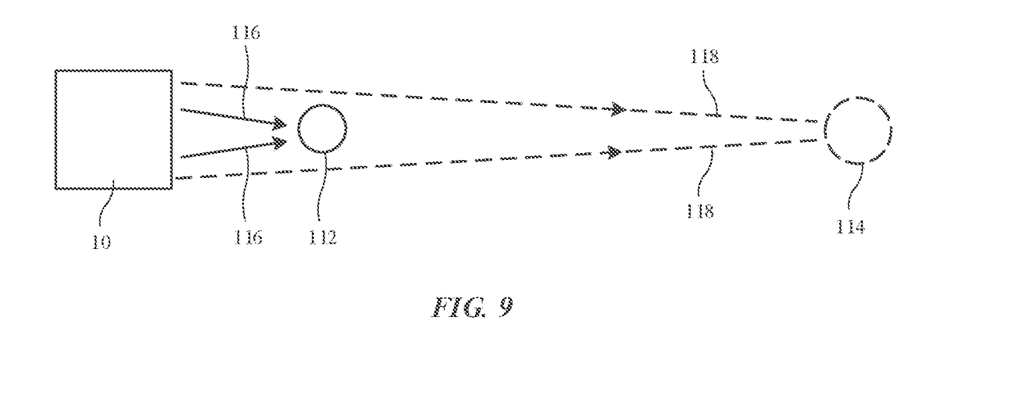
FIG. 9 is a diagram showing how an emitted light beam may be adjusted using an optical system to help enhance data gathering accuracy from an object in accordance with an embodiment.

Sensed objects may be located at a potentially wide range of distances from device 10 (e.g., from less than a meter to tens or hundreds of meters). To ensure that light beam 100 is effectively illuminating a desired target, adjustable light source 64 may be used to adjust beam divergence (e.g., using adjustable lens 70 of FIG. 4). This is illustrated in FIG. 9. As shown in FIG. 9, an object to be targeted by an optical sensor may be located close to device 10 (see, e.g., close object 112). In this scenario, lens 70 may be adjusted so that beam 100 converges onto object 112 as shown by light rays 116. In another scenario, the object to be targeted is located farther from device 10, as shown by distant object 114. To ensure that sufficient reflected light is detected by the optical sensor of device 10, adjustable lens 70 may be adjusted so that beam 100 is focused onto distant object 114, as shown by light rays 118. During use of device 10 to gather optical sensor data, dynamic focus adjustments such as these may be made to help maximize the reflected light signal from the object being sensed. In general, any suitable adjustments may be made to adjustable light source 64 and/or adjustable light detector 84 during optical sensing. These adjustments may include focus (light divergence) adjustments, beam steering adjustments, polarization adjustments, light modulation adjustments (e.g., adjustments to modulation scheme, modulation depth, modulation frequency, etc.), beam power adjustments, beam wavelength adjustments, etc.

Figure 10:
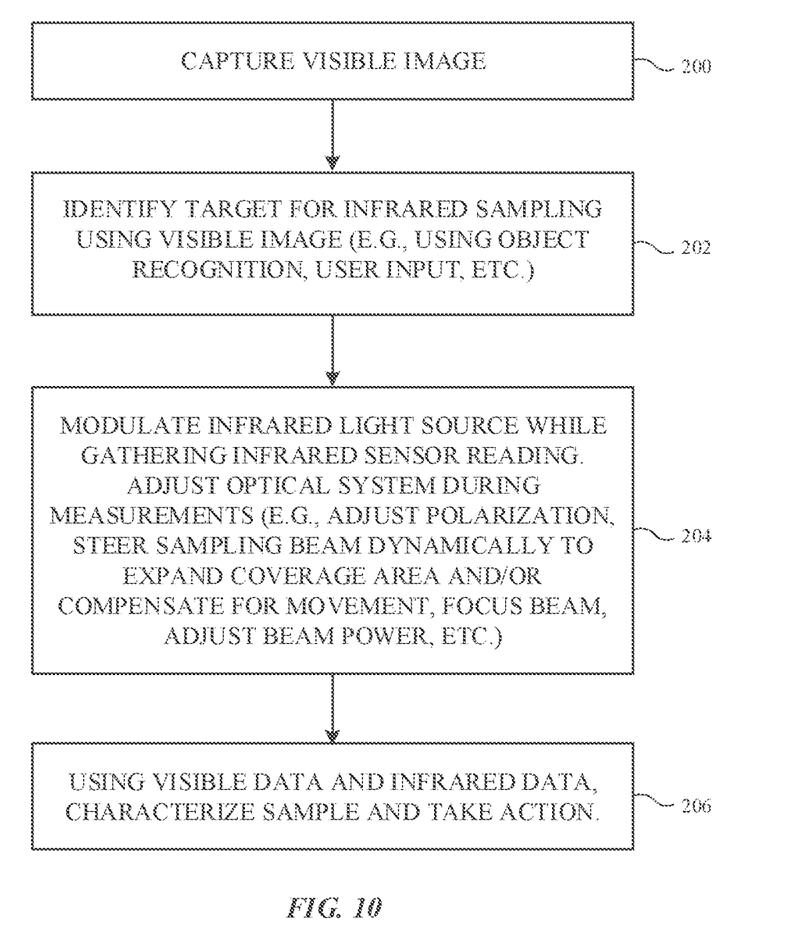
FIG. 10 is a flow chart of illustrative operations involved in gathering and using sensor data in accordance with an embodiment.

A flow chart of illustrative operations involved in using an optical sensor and other sensors 16 in device 10 to gather and use optical sensor information is shown in FIG. 10.

Figure 8:
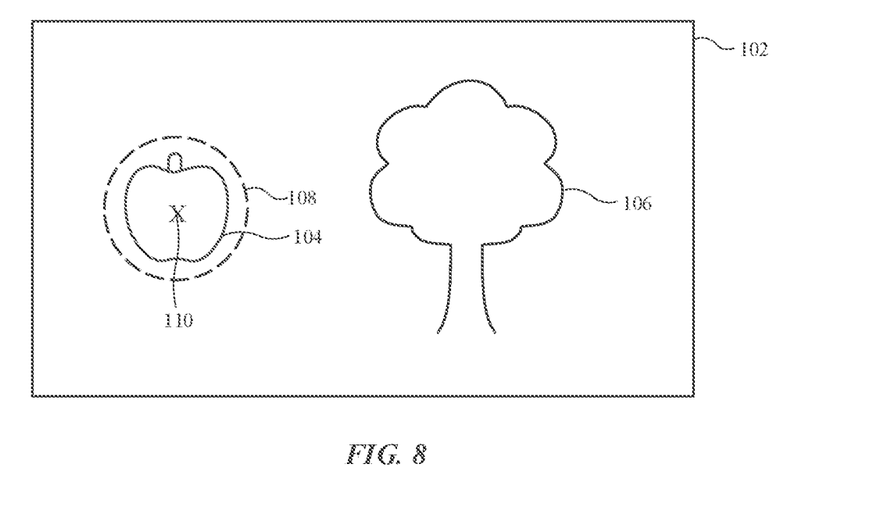
FIG. 8 is an illustrative camera image showing how image data may be used in targeting light beams during sensor measurements in accordance with an embodiment.

During the operations of block 200, a digital image sensor such as a visible light camera or other two-dimensional and/or three-dimensional image sensor may capture an image of the environment surrounding device 10 such as image 102 of FIG. 8.

During the operations of block 202, control circuitry 12 can use the captured visual image and, if desired, other information (e.g., preliminary information from a scan performed with beam 100 from source 64 and/or data from other sensors 16) to identify potential targets for subsequent infrared sampling (or other optical sensor measurements with the optical sensor formed from source 64 of FIG. 4 and detector 94 of FIG. 5). As an example, control circuitry 12 can use object recognition techniques to process the captured image and identify objects of interest for sensing. The objects of interest may be, for example, objects that were previously identified as being of interest by a user (e.g., food items, body parts such as a user's mouth where breath samples may be analyzed, etc.). If desired, the objects of interest can be objects that are known to be of interest by virtue of being predefined objects of interest in device 10, predefined objects of interest in an application (or other code) being run on control circuitry 12, or objects that are otherwise specified as being objects of interest by satisfying default or user-defined selection criteria.

Once control circuitry 12 is informed of which objects of interest should be located in the captured image, image processing techniques (e.g., techniques in which object attributes are analyzed and/or compared to a library of known objects of interest) can be used to identify the location and size of an object of interest in captured image 102. For example, control circuitry can identify object 104. If desired, a user may be provided with an opportunity to move an on-screen pointer onto a displayed object of interest. A user may, for example, touch an object of interest on a touch sensitive display or may gaze at the object of interest for more than a threshold amount of time (which can be detected by a gaze tracking sensor), thereby directing control circuitry 12 to identify the location of the borders of the touched object. Control circuitry can specify one or more target locations for beam 100 (see, e.g., target location 110 of FIG. 8) based on the known location of the object to be sampled.

During the operations of block 204, device 10 can use the optical sensor formed from source 64 and detector 94 to perform optical sensing on the object to be sampled. Light beam 100 can be steered onto the object using the beam steering capabilities of source 64. Light beam 100 can also be focused onto the object (e.g., the optical sensor can be adjusted to compensate for sample distance based on reflected signal strength feedback, distance information from a sensor such as a three-dimensional sensor, time-of-flight sensor, distance information from a radio-frequency sensor, or distance information from another sensor that measures object distance). During sampling, light beam 100 may be modulated in intensity as a function of time using a modulation scheme such as square wave modulation at a frequency f. Control circuitry 12 can demodulate the received light from photodetector(s) 92 using a corresponding demodulation scheme. By modulating and demodulation the light associated with the optical sensor, noise due to ambient light signals can be removed from the optical sensor signals.

Beam scanning techniques may, if desired, be used to raster beam 100 across a patch of an object of interest or may be used to place beam 100 in a discrete set of measurement locations, thereby allowing the signal-to-noise ratio to be improved by virtue of spatial averaging. Historical data can be maintained and measurements that deviate by more than a threshold amount (and that therefore likely contain noisy readings) can be discarded.

If desired, spectral detection techniques such as Fourier-transform infrared spectroscopy, spectral separation using dispersive optical elements, band-pass filtering, and other spectral detection techniques may be used to gather spectral data. The optical sensor (e.g., detector 94) may, if desired, include a tunable filter (e.g., component 86 may include a tunable filter such as a Fabry-Perot filter, tunable diffraction grating, adjustable prism or other dispersion optics, or other adjustable component) to help discriminate between signals at different wavelengths and thereby gather a desired spectral measurement from the optical sensor.

By using polarization-sensitive measurement techniques, polarization-sensitive optical properties of objects of interest can be characterized. As an example, infrared and/or visible light spectra can be gathered from an object under various different states of polarization for light beam 100 and/or various different polarization selectivity settings for detector 94. If desired, polarization-based measurements may be made to help remove specular reflection signals from the optical sensor measurements.

Optical sensor measurements may be made in any desired wavelength band of interest. For example, information on molecular vibrational and/or rotational resonances may be gathered using infrared measurements. During measurement operations, beam steering may be performed based on visual odometry tracking, orientation sensor tracking (e.g., accelerometer output), or other sensor-based tracking to help maintain beam 100 on the object of interest (e.g., to compensate for hand shaking when device 10 is being held in a user's hand). In scenarios in which reflected light signals are high, beam power can be reduced to conserve power. In scenarios in which reflected light signals are low, beam power can be increased to enhance measurement accuracy. When two-dimensional infrared measurements are gathered (e.g., by raster scanning beam 100 across the object of interest and/or by using a two-dimensional infrared image sensor), these infrared images (captured at one or more wavelengths) can be combined with corresponding visual images from a visible image sensor to provide more information on the sampled object (e.g., to provide two-dimensional infrared images that are characterized using image processing techniques). Infrared spectral data that is gathered by the optical sensor (e.g., without capturing a two-dimensional infrared image) can also be used in conjunction with visible-light image sensor data in characterizing objects.

After performing sensor measurements during the operations of block 204, device 10 can process the sensor data. In particular, visible data from a visible light sensor (e.g., a visible-light image that contains the target object) and/or infrared data from the image (e.g., from the beam steered onto the object and/or scanned across the object) can be compared to database information to characterize the object. For example, information on the shape and size of the target object that is gathered from a visible-light image captured with an image sensor can be combined with an infrared spectrum gathered with an infrared light sensor to characterize an object (e.g., to identify the object type, to determine object attributes, etc.).

The database information used by device 10 in characterizing target objects may include information on foods such as characteristic spectra corresponding to various food characteristics such as food freshness, fat content, protein content, carbohydrate content, species, sugar content, caloric content, food type (meat, fish, dairy, fruit, vegetable, etc.), sweetness, ripeness, etc. The database information may also contain information pertaining to human breath characteristics such as typical ammonia levels, acceptable alcohol levels for driving, etc. (e.g., so a user can compare infrared spectra obtained when the target object of interest is that user's breath and/or the user's mouth to human breath data from the database). In general, any type of object can be analyzed using the optical sensor (e.g., plants, animals, inanimate objects, food, paint, portions of a house or other building, automobile systems, electronic equipment, furniture, etc.). Sensor data analysis can be performed using spectral data such as infrared spectra, visible light sensor data at one or more wavelengths (e.g., color images from a camera), and/or other data acquired by device 10 using two-dimensional and/or three-dimensional pattern recognition techniques (image recognition techniques), using spectral matching techniques, pattern recognition using machine learning, or other techniques for classifying measured data against known database entries.

Manual input may be used to help control device 10. For example, a user may issue a command voice command, touch input, or other command may be supplied to input-output devices 22 to control device 10. Commands may be used to direct control circuitry 12 when and how to acquire data. For example, a voice command may be supplied to control circuitry 12 that directs control circuitry 12 to "scan orange" when control circuitry 12 has used pattern recognition to recognized a piece of fruit such as an orange as a potential target. Control circuitry 12 can use machine learning or other training algorithms to learn from previous user input, previous target recognition operations, and other operations (e.g., device 10 can use control circuitry 12 to implement self-learning techniques, to sense user's habits and interests, etc.).

After analyzing the acquired data, control circuitry 12 can take action in response to the analysis results. For example, if an abnormal condition (e.g., the presence of overly ripe food) is detected, device 10 can provide an alert for the user of device 10. If calories are measured in food, a cumulative calorie count in a food diary application on device 10 can be updated accordingly. In general, notifications can be issued, databases can be updated, recommendations may be provided, and/or other actions may be taken based on the results of the sensor processing operations of block 204. Notifications may include text notifications, audible alerts, email messages, annotated images of the target object, other on-screen notification content, and/or other notification content.

System 8 may gather and use personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing is merely illustrative and various modifications can be made to the described embodiments. The foregoing embodiments may be implemented individually or in any combination.

| Table of Reference Numerals | | | |
|---|---|---|---|
| 8 | system | 10 | electronic device |
| 12 | control circuitry | 22 | input-output devices |
| 16 | sensors | 14 | display |
| 24 | other devices | 26 | support structures |
| F1, F2 | sides | 32 | exterior |
| 34 | interior | 30W | optical window |
| 44 | printed circuit | 42 | electrical components |
| 58 | target object | 60, 62 | curves |
| 64 | adjustable light source | 66 | light-emitting devices |
| 68 | positioner | 70 | optical component |
| 72 | adjustable mirror | 74 | directions |
| 76 | beam | 80 | beam |
| 78 | polarizer | 94 | adjustable light detector |
| 90 | die | 92 | photodetectors |
| 86 | optical component | 88 | positioner |
| 84 | polarizer | 98 | sensor |
| 10' | device | 100' | beam |
| 102 | image | 106, 104 | objects |
| 108 | region | 110 | location |
| 116, 118 | light rays | 112, 114 | objects |
| 200, 202, 204, 206 | blocks | | |

What is claimed is:

1. A portable electronic device, comprising:
a housing;
a display in the housing;
a visible-light camera in the housing;
an infrared sensor in the housing that has an infrared light-emitting device configured to emit a beam of infrared light, a polarizer, and a beam steerer configured to steer the beam of infrared light; and control circuitry configured to use the beam steerer to steer the beam of infrared light onto a target object based on information from the visible-light camera.

2. The portable electronic device defined in claim 1 wherein the control circuitry is configured to control the infrared light-emitting device to adjust a wavelength associated with the beam of infrared light.

3. The portable electronic device defined in claim 2 wherein the infrared sensor comprises an infrared light detector configured to detect the beam of infrared light after interaction between the beam of infrared light and the target object.

4. The portable electronic device defined in claim 3 wherein the control circuitry is configured to control the infrared light-emitting device to adjust the wavelength associated with the beam of infrared light to a plurality of different infrared light wavelengths while receiving corresponding measurements from the infrared light detector.

5. The portable electronic device defined in claim 4 further comprising an adjustable lens, wherein the control circuitry is configured to adjust the adjustable lens to adjust the beam of infrared light.

6. The portable electronic device defined in claim 5 wherein the infrared light-emitting device is separated from the target object by a distance and wherein the control circuitry is configured to adjust beam divergence for the beam of infrared light by adjusting the adjustable lens based on the distance.

7. The portable the electronic device defined in claim 6 wherein the control circuitry is configured to measure the distance using the visible-light camera.

8. The portable electronic device defined in claim 6 further comprising a sensor configured to measure the distance.

9. The portable electronic device defined in claim 3 wherein the beam steerer is configured to steer the beam of infrared light to a plurality of different locations on the target object while the infrared light detector detects the beam of infrared light after interactions between the beam of infrared light and the target object.

10. The portable electronic device defined in claim 1 wherein the infrared light sensor further comprises a light detector with a plurality of photodetectors each of which is configured to detect a different portion of a range of infrared wavelengths associated with the beam of infrared light.

11. The portable electronic device defined in claim 10 wherein the beam of infrared light includes infrared light of multiple wavelengths spanning the range of infrared wavelengths.

12. The portable electronic device defined in claim 10 wherein the control circuitry is configured to control the infrared light-emitting device to adjust a wavelength associated with the beam of infrared light.

13. The portable electronic device defined in claim 1 wherein the infrared light sensor further comprises:
a light detector; and
a tunable filter, wherein the control circuitry is configured to adjust the tunable filter to pass different portions of a range of infrared wavelengths associated with the beam of infrared light to the light detector.

14. The portable electronic device defined in claim 1 wherein the infrared sensor comprises an infrared light detector and wherein the control circuitry is configured to modulate the infrared light-emitting device as a function of time while demodulating corresponding signals received by the infrared light detector.

15. The portable electronic device defined in claim 1 wherein the polarizer is configured to polarize the beam of infrared light emitted by the infrared light-emitting device.

16. The portable electronic device defined in claim 1 wherein the infrared sensor comprises an infrared light detector and wherein the polarizer is configured to polarize infrared light being detected by the infrared light detector after interacting with an external object illuminated by the beam of infrared light.

17. The portable electronic device defined in claim 1 further comprising an orientation sensor, wherein the control circuitry is configured to control the beam steerer to steer the beam of infrared light in response to information from the orientation sensor.

18. The portable electronic device defined in claim 1 wherein the infrared light-emitting device is configured to emit the beam of infrared light at a power and wherein the control circuitry is configured to adjust the power to different levels during different measurements with the optical sensor.

19. The portable electronic device defined in claim 1 wherein the control circuitry is configured to perform pattern recognition operations on an image captured by the visible-light camera to locate the target object within the image.

20. The portable electronic device defined in claim 1 wherein the polarizer comprises an adjustable polarizer and wherein the control circuitry is configured to use the adjustable polarizer to make measurements with the infrared sensor that discriminate specular light reflections of the beam of infrared light from the target object from non-specular light reflections of the beam of infrared light from the target object.

21. The portable electronic device defined in claim 1 wherein the polarizer comprises an adjustable polarizer and wherein the control circuitry is configured to use the adjustable polarizer to make measurements with the infrared sensor that discriminate light associated with the beam of infrared light after the beam of infrared light has interacted with a target object from ambient light.

22. The portable electronic device defined in claim 1 wherein the control circuitry is configured to gather an infrared spectrum of the target object using the infrared sensor.

23. A portable electronic device, comprising:
a housing;
a display in the housing;
an inertial measurement unit;
an optical sensor in the housing, wherein the optical sensor comprises:
an infrared light-emitting device that emits a beam of infrared light at different wavelengths;
a beam steerer that steers the beam of infrared light based at least partly on information from the inertial measurement unit; and
an infrared light detector that is configured to detect the beam of infrared light after the infrared light has interacted with a target object; and
control circuitry that is configured to characterize the target object based on an infrared spectrum gathered by the optical sensor.

24. The portable electronic device defined in claim 23 further comprising:
an image sensor, wherein the beam steerer is configured to steer the beam of infrared light onto the target object based on information from the image sensor.

25. The portable electronic device defined in claim 24 wherein the image sensor comprises a three-dimensional image sensor.

26. A portable electronic device, comprising:
a housing;
a camera configured to capture an image;
a display coupled to the housing that is configured to display the image;
an infrared light sensor with a scanning beam that is configured to gather an infrared spectrum from a target object; and
control circuitry configured to classify the target object based on the infrared spectrum and the image.

27. The portable electronic device defined in claim 26 wherein the image contains the target object and wherein the infrared light sensor comprises a steerable mirror and is configured to steer the beam with the steerable mirror using the image.

28. The portable electronic device defined in claim 26 wherein the control circuitry is configured to process information from the infrared light sensor based on user information and wherein the user information comprises user information selected from the group consisting of: user voice input, user habits, and user interests.

29. The portable electronic device defined in claim 26 wherein the image contains the target object, wherein the infrared light sensor comprises a beam steerer that is configured to steer the beam using the image, and wherein the beam steerer comprises a beam steerer selected from the group consisting of: an optical phased array and a beam steerer with diffractive optics.

30. A portable electronic device, comprising:
a housing;
a display in the housing;
a sensor in the housing;
an infrared light-emitting device configured to emit a beam of infrared light;
a beam steerer configured to steer the beam of infrared light, wherein the beam steerer is selected from the group consisting of: a rotating mirror, an optical phased array, and a diffraction grating;
an adjustable beam expander configured to control the beam of infrared light; and
control circuitry configured to use the adjustable beam expander to adjust expansion of the beam of infrared light while the beam of infrared light illuminates the target based on information from the sensor.

31. The portable electronic device defined in claim 30 wherein the sensor comprises an image sensor.

32. The portable electronic device defined in claim 31 wherein the image sensor comprises an infrared image sensor.

33. A portable electronic device, comprising:
a housing;
a display in the housing;
an image sensor in the housing;
an infrared light-emitting device configured to emit a beam of infrared light onto a target object;
an adjustable optical component; and
control circuitry configured to:
    perform pattern recognition operations on an image captured by the image sensor to locate the target object within the image; and
    use the adjustable optical component to adjust the beam of infrared light based on information from the image sensor while the beam of infrared light illuminates the target object.

34. The portable electronic device defined in claim 33 wherein the image sensor comprises a visible-light image sensor.

35. The portable electronic device defined in claim 33 wherein the image sensor comprises an infrared-light image sensor.

36. The portable electronic device defined in claim 33 wherein the infrared light-emitting device forms part of an optical sensor and wherein the control circuitry is configured to gather measurements from the optical sensor while the optical sensor is in contact with the target object.

* * * * *

UNITED STATES PATENT AND TRADEMARK OFFICE
CERTIFICATE OF CORRECTION

| | |
|---|---|
| PATENT NO. | : 11,513,003 B2 |
| APPLICATION NO. | : 16/922914 |
| DATED | : November 29, 2022 |
| INVENTOR(S) | : Sheng Liu, Guocheng Shao and Kenneth J. Vampola |

It is certified that error appears in the above-identified patent and that said Letters Patent is hereby corrected as shown below:

In the Claims

Column 15, Line 30, Claim 7, "The portable the electronic device" should read -- The portable electronic device --

Signed and Sealed this
Seventh Day of February, 2023

Katherine Kelly Vidal
*Director of the United States Patent and Trademark Office*